US006969845B2

(12) United States Patent
von Rosenberg, Jr.

(10) Patent No.: US 6,969,845 B2
(45) Date of Patent: Nov. 29, 2005

(54) SYSTEM AND PROCESSES FOR CAUSING THE SIMULTANEITY OF EVENTS INCLUDING CONTROLLING A PULSE REPETITION FREQUENCY OF A PULSED LASER FOR DISABLING A SCANNING IMAGING SYSTEM

(75) Inventor: Charles Walter von Rosenberg, Jr., Belmont, MA (US)

(73) Assignee: Textron Systems Corporation, Wilmington, MA (US)

( * ) Notice: Subject to any disclaimer, the term of this patent is extended or adjusted under 35 U.S.C. 154(b) by 257 days.

(21) Appl. No.: 10/325,787

(22) Filed: Dec. 20, 2002

(65) Prior Publication Data

US 2005/0224706 A1    Oct. 13, 2005

(51) Int. Cl.[7] .......................... H01J 3/14; H01J 40/14; H01J 5/16
(52) U.S. Cl. ........................................ 250/234
(58) Field of Search ............... 250/234–236; 235/462.42, 462.06, 462.25, 462.26, 462.27, 235/462.28, 462.29, 462.3, 462.31, 455, 235/466; 372/25–26, 28, 30, 38.02, 29.01

(56) References Cited

U.S. PATENT DOCUMENTS

| | | | | |
|---|---|---|---|---|
| 4,539,685 A | * | 9/1985 | Hart et al. ..................... 372/25 |
| 5,291,505 A | * | 3/1994 | Nielsen .................... 372/38.03 |
| 5,703,314 A | | 12/1997 | Meeker | |
| 5,784,023 A | * | 7/1998 | Bluege ....................... 342/104 |
| 5,793,477 A | * | 8/1998 | Laakmann .................... 356/28 |
| 6,359,710 B1 | * | 3/2002 | Takken et al. .............. 398/178 |
| 6,369,885 B1 | | 4/2002 | Brown et al. | |
| 6,410,897 B1 | | 6/2002 | O'Neill | |
| 6,674,520 B2 | | 1/2004 | Hicks et al. | |
| 6,697,408 B2 | * | 2/2004 | Kennedy et al. .............. 372/55 |
| 2002/0097390 A1 | | 7/2002 | Hicks et al. | |

OTHER PUBLICATIONS

"AN-600 Understanding Latch-Up in Advanced CMOS Logic," Fairchild Semiconductor Corporation Application Note, Jan. 1989, Revised Apr. 1999.

* cited by examiner

*Primary Examiner*—David Porta
*Assistant Examiner*—Suezu Ellis
(74) *Attorney, Agent, or Firm*—Lesley A. Hamlin; Gregory M. McCloskey

(57) ABSTRACT

A system and processes for causing the simultaneity of events from two or more families of events are described. A repetition rate and modulus of each one the first families of events is determined. A second family of events has a controlled repetition rate that optimizes the simultaneity of a number of events of the second family with a corresponding number of events from the first family within a desired time period. The first families of events can be occurrences of scanning an image of a target across a detector element of a scanning imaging system. The modulus can be a number of lines per frame of the scanning imaging system. Laser pulses having a pulse repetition rate can be events from the second family of events. A system and processes may disable one or more scanning imaging systems by controlling a pulse repetition frequency of a laser output.

18 Claims, 7 Drawing Sheets

SYSTEM AND PROCESSES FOR CAUSING THE SIMULTANEITY OF EVENTS INCLUDING CONTROLLING A PULSE REPETITION FREQUENCY OF A PULSED LASER FOR DISABLING A SCANNING IMAGING SYSTEM

BACKGROUND

Optical systems are commonly used in ground-based surveillance systems and in guidance systems of aircraft and missiles to identify and track other objects or aircraft. Such surveillance and guidance or "seeker" systems may be based on infrared detectors (IR), i.e., those that detect light in the infrared region of the spectrum. Such surveillance systems are often referred to as forward looking infrared systems or "FLIRs." Forward looking infrared imaging systems may be divided into two broad categories, namely, scanning systems and non-scanning or staring systems. For missile guidance there are also non-imaging systems based on a single detector element and modulating the light from a target image.

Staring systems have an image field of view that is fixed in relation to a focal plane of the system. In contrast, scanning imaging systems have an optical element, for example a prism or mirror, that rotates or oscillates, causing an image captured by the system to move or "scan" past a focal plane of the imaging system. Typically systems from each category have infrared detector elements or pixels positioned at a focal plane of the system. Because an image of the field of view of the system is focused at the focal plane, a detector placed at the focal plane may detect optical intensities and consequently the presence of any object in the field of view. An array of detectors may be used in place of a single detector, in which case the array may be referred to as a detector array. When an array is positioned at a focal plane of the system, the image received by the array may be processed by digital imaging techniques and systems.

Examples of applications in which forward looking infrared systems are used include missile seeker systems, airborne threat warning systems, and infrared search and track systems. Forward looking infrared systems are also used for navigation, target acquisition, fire control, and reconnaissance on aircraft, ships, ground vehicles and man-portable systems. As an example of the prominence of these infrared systems, it has been reported that shoulder-fired, surface-to-air missiles guided by infrared seeker systems have accounted for 80–90% of the aircraft combat losses since the Persian Gulf War of 1991, including the only Army attack helicopter downed by Iraqi forces during that war.

As used in imaging systems, detector arrays may be connected to or integrated with suitable digital signal processing circuitry for image processing, e.g., display, reconstruction, filtering, manipulation, etc. The detectors used in such arrays are often charge-coupled devices (CCDs) or photodiodes. A common type of array used in such scanning imaging systems is a linear, one-dimensional or "1×N" array, referring to the geometry of the array being one row or column with N individual detectors. The terms row and column are relative and depend on the orientation of one viewing the array. For the sake of clarity, the term "column" or "line" will be used hereinafter. Arrays of more than one column may be used in scanning systems. These arrays may be referred to as two-dimensional or "2D" arrays and may be referenced by the number of columns they contain and the number of elements residing in each columns, e.g., 2×128, 4×64, etc. When two or more columns are present in an array, the signal from each element or pixel may be added and averaged over time in a process called time delay integration (TDI) to improve the signal to noise ratio of the detected image. Common FLIR detector materials include indium antimonide, InSb, and mercury cadmium telluride, HgCdTe.

Some forward looking infrared systems include detectors that have in-focal-plane electronics, which enable signal processing on each detector or pixel in the array. Signal processing capability on each pixel may provide imaging advantages, such as the opportunity to perform digital matched-filter processes, but also presents opportunities to perform countermeasures that disable the pixel or array. It has been demonstrated that infrared detector arrays may be damaged and disabled by directing a laser beam at a detector element or pixel in the array.

When focused by imaging optics onto a detector array, a laser beam or pulse, if having sufficient fluence, can cause laser sparks, which in turn can produce laser-induced damage of the array material. Such resulting laser sparks may remove material by melt, ablation, vaporization and may "drill" down through the infrared detector material to the underlying processing electronics. This phenomenon may be referred to as laser-material interaction. Disablement of the pixel or array may occur when a spark induces thermal damage and/or mechanical damage or causes a quantity of charge to move though the layers of the detector into an underlying layer, e.g., readout integrated circuitry (ROIC), multiplexing circuitry, integration circuitry, etc. Any of such phenomenologies resulting from a laser spark can causes either an open circuit or a short circuit in one of the layers under the detector or array, causing a total shutdown of the functionality of the array. The focused beam or pulses may further interfere with the normal operation of the array by producing heated plasmas at the detector surface that may induce disruptive voltages and currents.

As previously stated, forward looking infrared systems using both scanning or non-scanning systems may employ detector arrays or focal plane arrays, where a focal plane array usually implies multiple columns of detectors. Staring systems employing focal plane arrays may be disabled by a continuous-wave (CW) or pulsed laser beam with sufficient fluence when the beam is focused in the focal plane. The focal plane array is always positioned at the focal plane of such a staring system, and the focal plane is fixed in relation to the focal plane array. Therefore, as long as the laser beam or pulse travels through the imaging system, the beam or pulse will be focused on the focal plane and any array positioned there. This is not the case with scanning imaging systems, however, since the image of the field of view is not fixed and is instead scanned past the focal plane, where the detector array is located. Therefore, there is no guarantee that at any particular time an incident laser beam will hit an array in the focal plane of the imaging system. At any particular time, the position on the focal plane where an incident laser beam is focused depends on the orientation of the moving optical element, e.g., prism or mirror. As a result, an incident laser beam or pulse may be focused on an area of the focal plane that at the moment critical for disablement does not include the detector array, despite the beam or pulse having entered the optical imaging system.

Besides being disabled by material damage from a direct hit through laser-detector interaction, an array may also be at least temporarily disabled by the application of a laser beam not directly on but near to the array, for example on whatever material is adjacent to the array. This temporary disablement condition may be referred to as a "latch-up"

condition. The latch-up condition is not a damage condition but the functionality of the array is lost until the array system is rebooted. For a more detailed description of latch up, see "Understanding Latch-Up in Advanced CMOS Logic," Application Note, Fairchild Semiconductor Corporation (Revised 1999).

Countermeasures have been developed to attempt to defeat the seeker systems of "guided" missiles. U.S. Pat. No. 5,703,314 issued to Meeker discloses a countermeasure system, adapted for use onboard an aircraft, for confusing an incoming missile as to the location and heading of the aircraft. The countermeasure system generates for each side of the aircraft at least two infrared energy images, which are projected onto the aircraft's fuselage and then swept across the aircraft's fuselage to confuse the incoming missile's infrared seeker. This system does not disable a detector in the guidance system of the missile.

U.S. Pat. No. 6,369,885 issued to Brown et al. discloses a missile tracking and deflection system for protecting a platform that includes a missile warning system for detecting the presence of a missile and generating a warning signal. A countermeasure processor receives the warning signal and analyzes characteristics of the missile to prioritize a trajectory signal. The countermeasure processor generates a jam code delivered by a laser beam to divert the trajectory of the missile away from the platform. U.S. Pat. Appl. Pub. No. U.S. 2002/0097390 with inventors Hick et al. is a continuation-in-part of U.S. Pat. No. 6,369,885 and further discloses that a nulling or blanking signal may be used during generation of the laser beam to improve reception of the active signature. Neither of the disclosed systems disables a detector in the guidance system of the missile.

While CW lasers producing a beam of sufficient fluence might hit and disable a focal plane array within a scanning imaging system, the average power requirements to ensure disablement could require a laser and power source that are prohibitively large for aerospace applications where mass is a critical consideration. Therefore, there is a need for a system and processes for disabling scanning imaging systems by use of a pulsed laser having a carefully controlled pulse repetition frequency.

SUMMARY OF THE INVENTION

The present invention is directed to the optimizing of the probability of achieving the simultaneous occurrence of events from different sets of events, one set with a known repetition frequency but unknown phase and the other set with a repetition frequency that is controlled. One or more first sets or families of first events have a first repetition frequency that is predetermined but the phase of which is unknown. An example of such a first family of events could be the scanning rates of one or more scanning imaging systems. A second set or family of second events has a repetition frequency that is controlled to maximize the simultaneous occurrence of an event from that set with desired number of events from one of the first sets of events within a desired time period. The repetition rate of the second set events is calculated from the first repetition rate and in preferred embodiments of the invention is slightly asynchronous with the first repetition frequency and its subharmonics. A laser pulse repetition frequency is one example of the second set of events.

A first aspect of the present invention includes a process for producing the simultaneity of a number of events from a first family of events with an equal number of events from a second family of events. A first repetition frequency of the first family of events is determined or identified. The first family of events is repetitive in a predetermined way and has a modulus. Based on the first repetition frequency, a second family of events having a second repetition frequency is produced. The simultaneity between a number of events of the second family and an equal number of events of the first family is caused within a predetermined time period and with a precision equal to a time increment. The repetition frequency of the second family of events may be proportional to the inverse of a number of steps, which may be equal to the largest integer value less than or equal to the product of the predetermined time period and the quotient of the first repetition frequency divided by the modulus. In preferred embodiments, the predetermined time period may be one second. In preferred embodiments, the time increment is plus or minus one-half of the inverse of the first repetition frequency.

A second aspect of the present invention includes a process for disabling a scanning optical system. The scanning optical system has a focal plane array and a modulus. A line rate of the scanning optical system is identified, and a disablement time is selected. A number of steps is calculated and may be equal to a closest integer equal to the product of the disablement time and the quotient of the line rate divided by the modulus. A laser output of two or more pulses may be controlled to have a pulse repetition frequency equal to the line rate divided by the number of steps. The line rate may be equal to the product of the system scanning or frame rate and a modulus or lines per frame. The process may also include calculating a remainder of the quotient of the modulus divided by the number of steps. The reminder may be compared to zero. An index having a corresponding index time period may be supplied to the number of steps when the remainder equals zero. When the reminder does not equal zero, then a quotient of the number of steps and the remainder may be calculated. The process may further include supplying a time index period after a time period equal to the product of the inverse of the frame rate and the quotient of the number of steps divided by a largest common factor of the number of steps and the remainder. The index time period may be the inverse of the line rate.

A third aspect of the present invention includes a computer-readable medium having computer-executable instructions stored thereon to perform the step of producing two or more events of a second family of events having a second repetition frequency based on knowledge of first repetition frequency of a first family of events. The second repetition frequency may be proportional to the inverse of a number of steps, and the number of steps may be equal to the largest integer less than or equal to the product of a desired time and the quotient of the first repetition frequency divided by a modulus. An index having a corresponding index time period may be supplied to one or more of the number of steps. Supplying the index time period may include determining a remainder and comparing the remainder to zero. An index having a corresponding index time period may be supplied to the number of steps when the remainder equals zero. When the reminder does not equal zero, then a quotient of the number of steps and the remainder may be calculated. The process may further include supplying an index time period after a time period equal to the product of the inverse of the first repetition frequency divided by the modulus and the quotient of the number of steps divided by a largest common factor of the number of steps and the remainder. The index time period may be the inverse of the first repetition frequency.

A fourth aspect of the present invention includes a system for disabling a scanning optical system having a focal plane array, a frame rate, a number of lines per frame and a line rate. A laser is included that is operable to produce two or more pulses having a first repetition frequency. Each of the two or more pulses has a fluence that is sufficient to disable a detector in the focal plane array of the scanning optical system when the pulse is received by the scanning optical system. A means for controlling the triggering of the two or more pulses is included, and this means may be a computer, which may control an optical switching element or device, e.g., a Q-switching element, a chopper wheel, etc. At least one of the two or more pulses hits a detector of the scanning optical system. The means for controlling may produce a pulse repetition frequency of the two or more pulses or may cause the two or more pulses to be triggered stochastically. The pulse repetition frequency may be may be equal to the inverse of a line rate divided by a number of steps, and the number of steps may be equal to the largest integer less than or equal to the product of a desired time and the frame rate of the scanning optical system. An index having a corresponding index time period may be supplied to one or more of the number of steps between the two or more pulses. The index time period may the inverse of the line rate.

The present invention will become apparent from a review of the accompanying drawings and the following detailed description of preferred embodiments.

DETAILED DESCRIPTION

The present invention may be understood by the following detailed description, which should be read in conjunction with the attached drawings. The following detailed description is by way of example only and is not meant to limit the scope of the present invention.

The present invention is directed to a system and processes for causing the simultaneity of events from different families of events. One or more of first families of events have a known repetition frequency but an unknown phase. A second family of events has a repetition frequency that is controlled to optimize or efficiently produce a simultaneous occurrence of one or more events from the first family with one or more events from the second family. A family of events can have a modulus, i.e., a geometric or temporal repetitive pattern, or both. Non-repetition of subsequent events of the second family of events with a particular first family event can be achieved by introducing or supplying at specific times a step offset in time relative to the first repetition frequency. Certain embodiments of the inventions include systems and processes for selecting the pulse repetition frequency of a pulsed laser to disable one or more scanning imaging systems on a platform, e.g., a surveillance system. The scanning systems may have a line or array of detector elements, i.e., a detector array, of known size and can have a known scanning or frame rate but an unknown phase or offset of the process. As used herein the term "platform" refers to structures including but not limited to ships, aircraft, or ground-based installations. Further, as used herein the term "pulse" may include reference to a pulse having a substructure of even faster modulation than the overall structure of the pulse.

Figure 1:
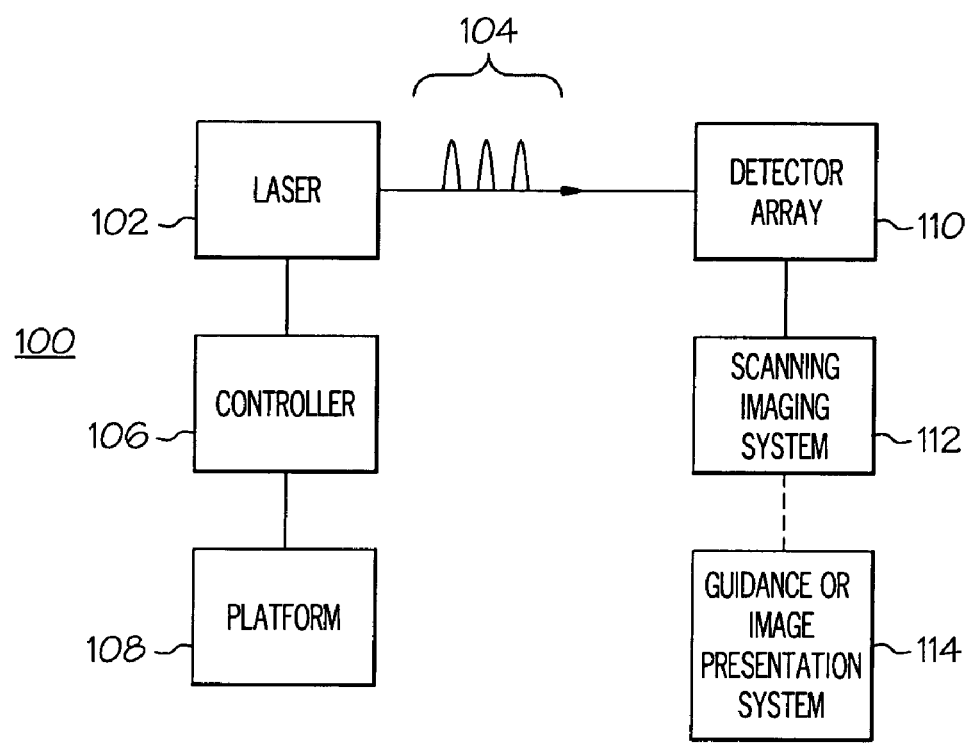
FIG. 1 is a block diagram of a system according to one embodiment of the present invention.

Referring now to FIG. 1, a system 100 according to one embodiment of the present invention will now be described. This system 100 may be used on any platform 108 including manned or unmanned spacecraft or aircraft, ships or ground-based installations. A laser 102 produces an output of pulses 104 and is controlled by a controller 106. The controller 106 may be of any suitable kind and functions to trigger the pulses in the output 104. The controller 106 may also include or control circuitry and apparatus for pumping the laser 102. In preferred embodiments, the controller 106 includes a computer that operates to provide modulation control to modulation components of the laser 102, including but not limited to a Q-switching elements, a chopper wheel, etc. In preferred embodiments this system 100 is used to disable a scanning imaging system 112, which may be operating as part of a missile guidance system or an image presentation system 114 for operator viewing and computer analysis. The scanning imaging system 112 includes a detector array 110. The detector array 110 has one or more columns or lines with a number of detectors or pixels per column, e.g., 1×128, and each column or line of the detector array 110 has a certain physical width. The imaging system has a field of view or frame that is scanned at a given frame rate, e.g., 30 Hz, across the detector array 110 by an imaging optics system that includes a mirror or prism that may rotate or oscillate (not shown). The frame has a number of lines per frame or modulus equal to the width of the frame divided by the width of the detector array column or line. As a result, when the moving optics scan the field of view or frame past the detector array 110, the number of lines per frame are scanned. As a consequence, the imaging system has a line rate of scanned lines per second that is equal to the lines per frame multiplied by the frame rate.

Laser 102 may be of any type. In preferred embodiments the laser is a solid state laser, having an active medium of, e.g., Neodymium or Ytterbium doped Yttrium-Aluminum-Garnet (YAG), Chromium-doped Lithium-Strontium-Aluminum-Fluoride (Cr: LiSAF), Chromium-doped Lithium-Strontium-Gallium-Fluoride (Cr:LiSGaF), etc., and producing an output of pulses 104 with the pulses having energies of between approximately 0.1 Joule/pulse to ten Joules/pulse. In certain embodiments, an optical parametric oscillator or other device may be used to shift the output 104 of the laser 102. The controller 106 functions to trigger the firing of the pulses in the output 104. In certain embodiments, the controller 106 may include an element or elements within or coupled to a resonator of the laser 102 such as Q-switching elements, cavity dumping elements, active mode-locking components, etc.

The output of pulses 104 are produced by the laser 102 such that each pulse of the output of pulses 104 has sufficient fluence to disable one or more of the detectors in the detector array 110 of the scanning imaging system 112 when the pulse is focused by the scanning imaging system on one or more elements of the detector array 110. The pulses in the output 104 may have a pulse recurrence or pulse repetition frequency that is precisely controlled according to embodiments of the present invention, or may also be produced in a stochastic or random manner according to embodiments of the present invention. One example for producing such a stochastic output is described as follows.

A random number generator (not shown) may be used in addition to controller 106 to trigger the laser 102 to produce an output of pulses 104 in a stochastic manner. For pulses fired in such a stochastic or random manner, a cumulative probability of hitting a detector array 110 of interest may approach 100% for a sufficiently large number of pulses. For a scanning imaging system having a 1×N detector array and producing an image with a certain number of line per frame (LPF)×N rows, the probability $P_1$ that any particular laser pulse aimed at the scanning imaging system will hit the detector array is given by the following equation:

$$P_1 = 1/LPF \tag{1}$$

provided that the laser is somewhere in the image field of view of the scanning imaging system. If an arbitrary number of pulses N are fired from the laser to the imager, and each pulse is stochastically independent of the others with respect to hitting the detector array, then the cumulative probability of hitting the detector array is given by the following equation:

$$P_N = 1 - (1 - P_1)^N \tag{2}$$

To obtain a particular probability $P_N$ of hitting the detector, the number N of stochastically independent pulses required is given by the following equation:

$$N = [\ln(1-P_N)/\ln(1-P_1)] \tag{3}$$

From equation (3) it can be determined that for most situations, a number of pulses N equal to three times the lines per frame of the focal plane array in question would have a 95% probability of hitting the detector array in a scanning imaging system.

Regardless of how the individual pulses are triggered, i.e., with a controlled pulse repetition frequency or stochastically, the individual pulses may disable the scanning imaging system 112 in several ways, for example, by (i) hitting the detector array 110 and damaging material in the detector array 110 or associated circuitry, e.g., read-out integrated circuitry (ROIC), (ii) hitting an area close to the detector array 110 and causing latch-up, or (iii) by entering the scanning imaging system 112 and saturating or "blinding" the detector elements of the detector array 110. Such disablement by saturation may be effective if the recovery time of the detector elements is sufficiently long. Disablement by the latch-up condition and also by saturation of the detectors or pixels in the detector array 110 are described in greater detail below.

Figure 2:
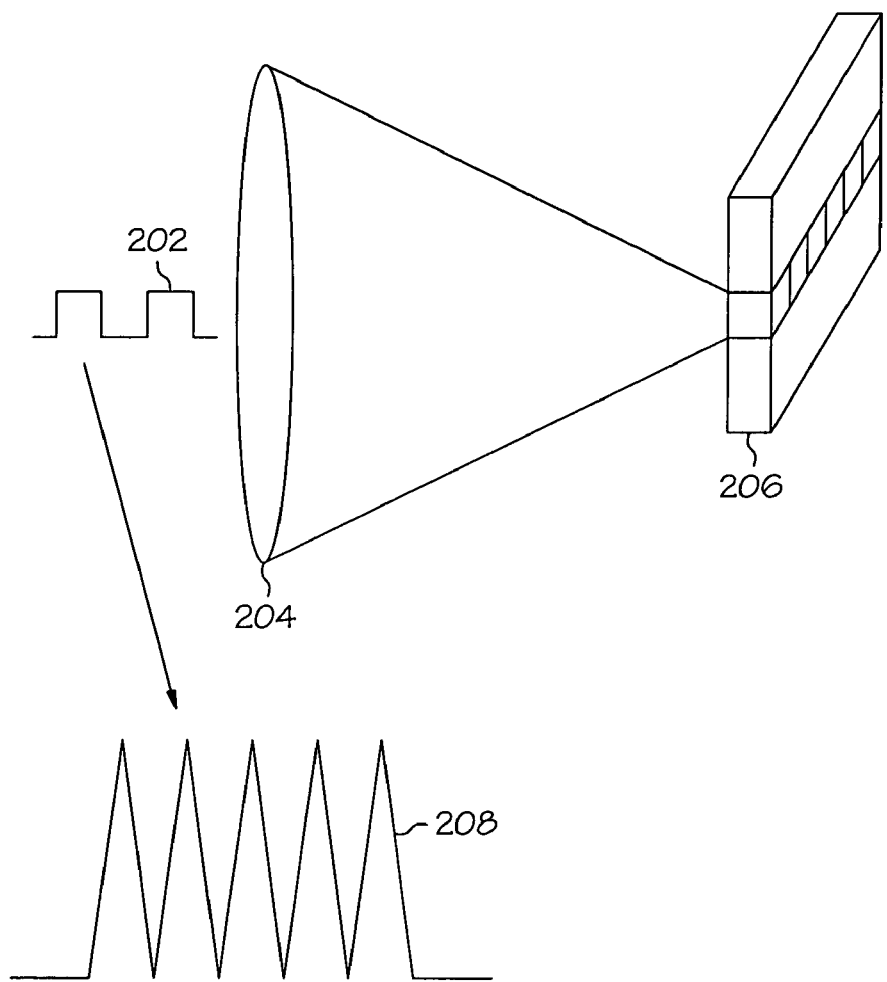
FIG. 2 shows a simplified diagram of a portion of a representative scanning imaging system.

Referring now to FIG. 2, a portion of a representative optical scanning system, e.g., a seeker system, is shown including a lens 204 and a detector array 206. Moving optics present in the seeker imaging system have been omitted for the sake of clarity. The detector array 206 is positioned within the system at the focal distance of the lens 204 so that infrared radiation, e.g., pulse 202, entering the seeker system is focused on the detector array 206. A pulse 202 produced by a pulsed laser, e.g., 102, may disable the seeker imaging system by directly hitting one or more elements of the detector array 206. A pulse 202 may also disable the seeker imaging system without directly hitting the detector array 206, but by hitting an area near the detector array 206 and causing latch-up or by scattering and reflection within the seeker system. Latch-up in the detector array 206 may occur when a pulse with sufficient fluence hits the detector array 206 or near to the detector array 206. Latch up may be characterized by excessive current drain in the detectors of the detector array 206 and may be associated with functional failure, parametric failure or device destruction. FIG. 2 also shows that a pulse 202 produced by a system according the present invention may have a substructure 208. In certain embodiments, this substructure 208 may be produced by modulating an output from a laser with an electro optic modulator to produce a substructure frequency of between 1 kHz and 100 kHz.

For a given pulse repetition frequency of a laser output that is equal to the line rate of a particular scanning imaging system, there may be a very high probability that a pulse will hit the detector array of the scanning imaging system. However, for high line rates, the corresponding high pulse repetition frequencies may require a laser that has unacceptably high average power requirements for certain applications, e.g., aerospace, where mass and heat dissipation are critical considerations. While the scope of the present invention includes all pulse repetition frequencies less than the line rate of a particular scanning imaging system for the disablement of the scanning imaging system within a desired time, preferred embodiments of the present invention include one or more pulse repetition frequencies that are noticeably lower than the line rate of a particular scanning imaging system, as will be described in the following further embodiments.

Figure 3:
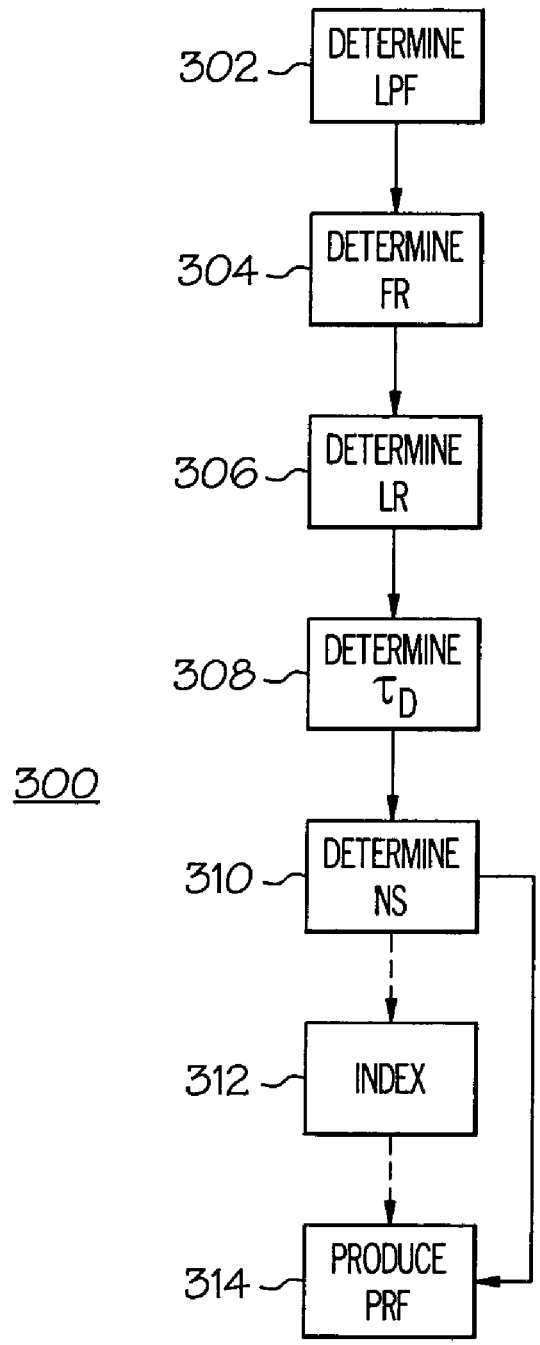
FIG. 3 shows a process according to one embodiment of the present invention for producing a laser pulse repetition frequency to disable a scanning imaging system having known parameters.

Referring now to FIG. 3, a process 300 of one embodiment of the present invention will now be described. The process may be followed to control a pulse repetition rate for a pulsed laser so as to disable a scanning imaging system on a platform, e.g., a guided missile or a ground-based observation system. By this process 300 or iteration of this process 300, each position or line of a focal plane of a scanning imaging system having known parameters may be efficiently accessed or hit by a pulsed laser within a desired disablement time. As used herein, when a value of a particular number of steps NS leads to such accessing or hitting of all lines of a focal plane within a desired disablement time without any lines being hit more than once, the result is referred to as an "Efficient Solution." Efficient Solutions are preferred over other solutions because they minimize the number of pulses and consequent power requirements that are needed to disable a particular scanning imaging system in a given amount of time.

Through knowledge of the particular scanning imaging system used, the number of lines per frame (LPF) and frame rate (FR) of the scanning imaging system are determined, step 302, and step 304. It is noted that the time between successive scans of a frame can include a scanning time or scanning portion and a reset time or reset portion within which the scanning imaging system resets itself and is not scanning. Consequently, the frame rate can have a scanning portion and a reset portion. Such knowledge of scanning imaging systems may be acquired through various means including reverse-engineering of similar scanning imaging systems, by espionage, or by knowing that the scanning imaging system of interest belongs to a class or family of threats with known system parameters.

Once the number of lines per frame and the frame rate are known, a line rate LR is determined, step 306, according to the following equation:

$$LR = LPF * FR \quad (4)$$

The inverse of the line rate represents the time period that the particular scanning imaging systems takes to scan a line within the field of view at the focal plane. This time period, which may be measured in units of the inverse of the line rate $(LR)^{-1}$, is a fundamental period of time for each particular scanning imaging system. Next, a desired disablement time $\tau_D$ is selected, step 308. The desired disablement time $\tau_D$ is arbitrary and represents the time within which the disablement of a scanning seeker system containing the focal plane array is desired. The desired disablement time may be influenced by ballistic and/or flight mechanics or mission scenarios of the various platforms. In preferred embodiments, a disablement time of 0.1 to 10 seconds may be selected. While any time period may be selected for the disablement time, one second is the value used for further embodiments herein.

Following the selection of a disablement time, a number of steps NS is calculated, step 310, which can correspond to a time interval or period equal to NS/LR. The number of steps NS value is used in the control of the output of a pulsed laser used to disable the particular scanning imaging system. The quotient of the number of steps divided by the line rate represents the time period in seconds between pulses produced by the laser and determines a pulse repetition frequency of the output of the laser. The number of steps and the pulse repetition frequency are related through an inverse relationship. The number of steps value NS is calculated by taking into consideration the desired disablement time and the parameters of the scanning imaging system. The number of steps may be calculated according to the following equation:

$$NS = Int(\tau_D * FR) \quad (5)$$

where Int(a) means the largest integer $\leq a$, and FR is the frame rate of the scanning imaging system. When the scanning system of interest has an even number of lines per frame, the number of steps as calculated by Equation (5) can be the modified to be an odd integer nearest to NS as determined by the equation. In any case NS can be advantageously changed to be a prime integer nearest to the NS determined by the equation. Choosing a number of steps that is an odd or prime number can produce Efficient Solutions without the need for indexing.

Using the values of the number of steps NS calculated in equation (5) and the line rate LR, a pulse repetition frequency (PRF) is calculated according to the following equation:

$$PRF = LR/NS \quad (6)$$

where $(PRF)^{-1}$ is equal to NS/LR, which is the time or period between laser pulses. This pulse repetition frequency is then provided to an output of a pulsed laser system, step 314. This output, when aimed at the collecting lens of the scanning imaging system of interest, is optimized to strike the detector array of the scanning imaging system of interest within the desired disablement time. If the pulses of the output are of sufficient fluence, the detector array can be disabled within the desired disablement time.

An index time period, described in greater detail below, may be supplied to one or more periods between laser pulses, step 312, to facilitate disablement of a particular scanning imaging system. Such indexing can be used to obtain an Efficient Solution, and may be desired when the number of steps value NS does not ensure an Efficient Solution for the particular scanning imaging system. Indexing has the effect of altering the time between two pulses in the output of a pulsed laser, e.g., 102, that is used as a countermeasure to disable or defeat an imaging system.

By producing a pulse repetition frequency in an output of a laser in the above-described manner, the probability is increased that a pulse from the output of the laser will hit the detector array of a scanning imaging seeker system and disable the seeker system within a desired time. In this way, a laser, e.g., 102, of a countermeasure system on a platform, e.g., an aircraft, may disable a seeker system, without knowledge of when the detector array of the scanning seeker system is aligned with the position of the laser in the field of view, i.e., when a pulse from the laser and the seeker detector array are aligned in the focal plane of the seeker imaging system.

Figure 4:
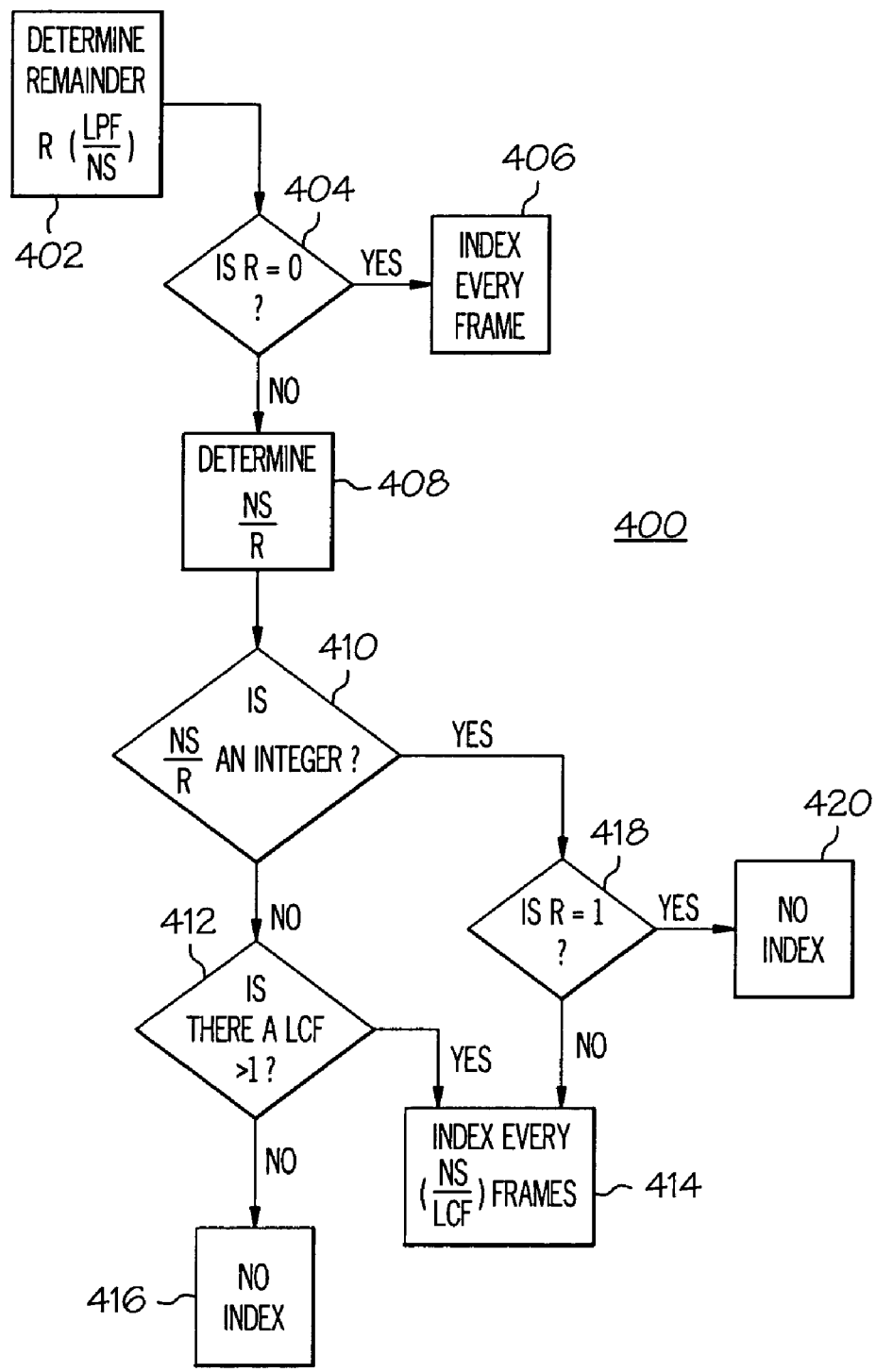
FIG. 4 shows a process for supplying a time index period between pulses of a laser output according to one embodiment of the present invention.

In preferred embodiments of the present invention, an index time period may be provided to the output of a pulsed laser to optimize the disablement of a scanning seeker imaging system. Such an index time period may correspond to a step or index applied to the number of steps NS. Because the pulse repetition frequency is related to the number of steps NS by equation (6), the index, when applied, may produce a corresponding index time period between successive laser pulses. The index can thus shift pulses in the otherwise uniform pulse repetition frequency of the laser and consequently shift the location that the pulses hit in the image within the field of view of the scanning imaging system. The need for an index time period may be determined according to process 400 shown in FIG. 4. To first determine if and when an index time period should be applied between subsequent laser pulses used for the disablement of a particular scanning imaging system, a remainder R may be calculated, step 402. Remainder R may be calculated from the quotient of lines per frame LPF divided by a number of steps NS, both of which have a positive integer value, according to the following equation:

$$R = R[LPF/NS] \quad (7)$$

where R[a/b] indicates the remainder function that returns an integer remainder of the quotient of a and b. The remainder R represents information regarding the ability of the laser pulses to repeat a position in the image before hitting all line positions once.

Continuing with the description of process 400, the remainder R is compared to zero, at step 404. If the remainder R is equal to zero, then an index may be added to the number of steps corresponding to every frame of the scanning imaging system. This index may be applied to the pulse repetition frequency PRF and can consequently result in an index time period being applied to two successive pulses after a time period equivalent to that which elapses for one scan of the entire field of view, step 406. This index time period should be applied when the remainder is equal to zero because without doing so, subsequent pulses entering the scanning imaging system of interest would hit the same positions on the focal plane after a time period of 1/FR, ensuring that the pulses always hit the same position in the image, which position either (a) coincides with a pixel on the array sensor, or (b) does not. If (a) occurs, disablement pulses hit the detector array repeatedly. If (b) occurs, the pulses never hit the array except perhaps by chance due to the relative motion of the sensor system and the laser. In preferred embodiments, the index time period is equal to an integer which when divided by the line rate represents an additional increment of time, added to NS/LR, between two laser pulses.

Returning to step 404, when the remainder R is not equal to zero, a value of the quotient of the number of steps divided by the remainder is calculated, step 408. Next, this quotient is examined to see if it is an integer, step 410. If the quotient is not an integer, a largest common factor, not including one, of the number of steps and the remainder is sought, step 412. If a largest common factor does exist, then indexing is applied to the number of steps for every time period corresponding to the number of steps divided by the product of the largest common factor and the frame rate, i.e., every NS/LCF frames, step 414. If there is no largest common factor, then no index is applied to the number of steps, shown as 416, as the pulse repetition frequency corresponding to the number of steps represents an Efficient Solution, and the pulses from the laser will hit all line positions of the scanning imaging system of interest within the desired disablement time, thereby optimizing the disablement of the scanning imaging system.

Returning to step 410, when the quotient of the number of steps divided by the largest common factor is an integer, the remainder R is compared to one, step 418. If the remainder is equal to one, then no index time period is applied, shown as 420, because the number of steps provides an Efficient Solution for disablement of the scanning seeker system. If the remainder is not equal to one, step 418, then an index time period is applied to the number of steps every for every time period corresponding to the number of steps divided by the product of the largest common factor and the frame rate, i.e., every NS/LCF frames, step 414. In preferred embodiments, the value of the index time period may be the time period in which one line of the scanning seeker system of interest is scanned, e.g., plus or minus $(LR)^{-1}$. Such index time period, and related index, can have the effect of shifting subsequent pulses within the field of view. In preferred embodiments, the index is kept constant once it has been determined and applied to a pulse repetition frequency of a laser so that the pulses produced hit all lines of a focal plane of a scanning imaging system of interest.

Processes 300 and 400 described above can produce Efficient Solutions for the disablement of a particular scanning imaging system having a detector array, a given lines per frame LPF, and frame rate FR. A number of steps NS is calculated which is used in the control of a laser output to disable the scanning imaging system. A quotient (LPF/NS) may be calculated and has remainder R. The remainder R represents information regarding the ability of the laser pulses to repeat a position in the image frame within the scanning imaging system before hitting all line positions once. Process 300 may produce an Efficient Solution when: (i) NS/R does not equal and integer, and (ii) NS and R do not share a common factor. Otherwise, successive pulses could hit or repeat the same line position in frame number [(NS/LCF)+1], in which cases process 400 may be following to implement indexing after time periods corresponding to (NS/LCF) frames.

Figure 5:
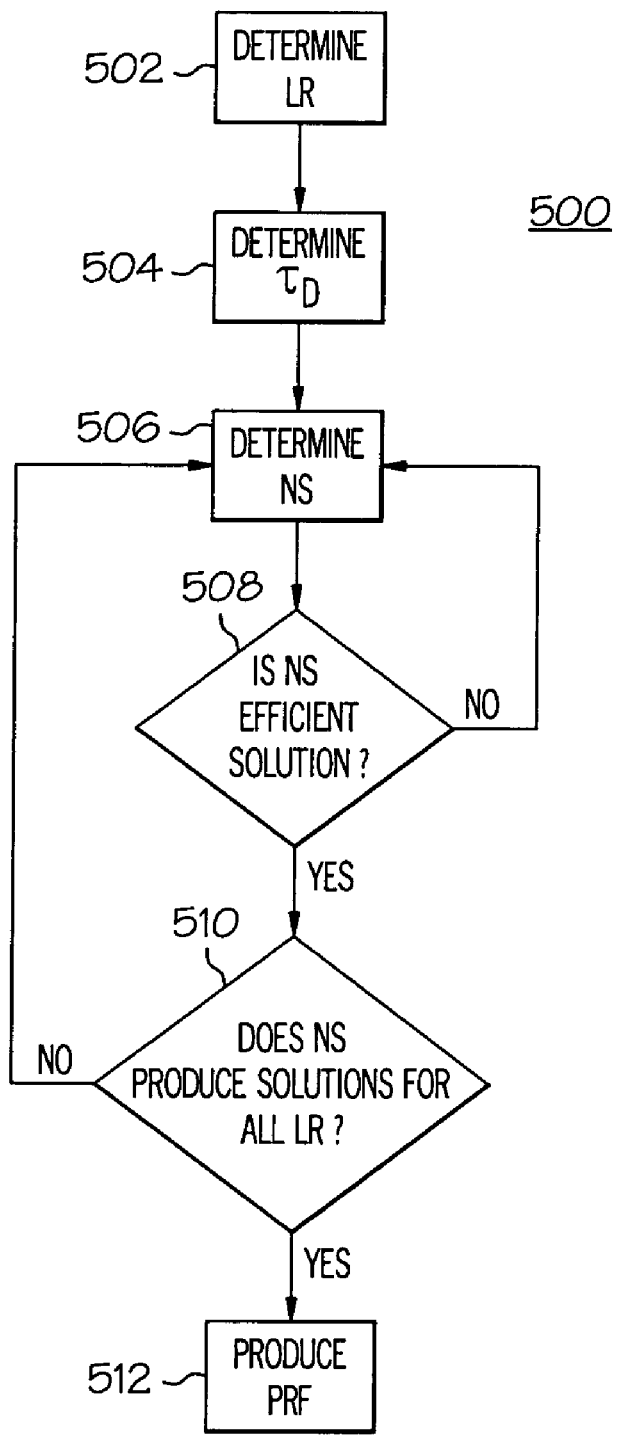
FIG. 5 shows a flow chart describing the selection of a laser pulse repetition frequency to disable one or more scanning imaging systems of a suite of scanning imaging systems according to one embodiment of the present invention.

Referring now to FIG. 5, a process according to another embodiment of the present invention may be used to select a pulse repetition frequency for a pulsed laser when it is desired to disable one or more scanning seeker systems, which are only known to be a member of a collection of threats or a suite, each possibly having differing scanning rates and detector array sizes. For the first step, a maximum line rate LR in the suite of threats is identified, step 502, and a desired disablement time $\tau_D$ is selected, step 504. Next, a trial number of steps NS is chosen, step 506. The number of steps may be calculated as for processes 300 and 400 using the parameters of the scanning imaging system with the maximum line rate. In preferred embodiments, the number of steps may be an integer near to the value of the frame rate of the system with the maximum line rate in the suite multiplied by the desired disablement time $\tau_D$. In certain embodiments, the number of steps is an odd number. In preferred embodiments, the number of steps is a prime number.

If the selected number of steps does not produce an Efficient Solution for a first-examined member of the suite in step 508, a new value of NS is selected, step 506. If the selected number of steps NS does produce an Efficient Solution in step 508, then each other member in the suite is examined, step 510, to see if the number of steps produces a solution for the different line rates in the suite, i.e., ensures that each line position is hit in the focal plane of each threat or seeker system in the suite. If the number of steps does ensure that all line positions in all of the focal planes in the suite are hit, then a pulse repetition frequency corresponding to the number of steps is applied to an output of a suitable laser to disable the seeker systems of the suite, step 512. At step 510, if the number of steps does not ensure that all lines are hit in each focal plane in the suite, a new number of steps is selected and examined and the process 500 is iterated, starting again at step 506. Iteration continues until a solution is found that either covers all possible line positions in a time $\tau_D$, or maximizes the number of line positions covered in $\tau_D$.

In the case that a threat in the suite has or presents a line rate that is unknown, embodiments of the present invention may be controlled to produce a stochastic output of laser pulses to disable the scanning imaging system with the unknown line rate. In addition, either scanning or non-scanning imaging optical systems in the suite of threats may be defeated or disabled by producing one or more pulses having a substructure. In preferred embodiments, such substructure may be produced by controlling a modulation device such as Q-switch, chopper wheel, shutter, rotating optical element, electro-optic modulator, etc., to modulate an output of pulses from a laser. For example, a laser producing pulses may be modulated by a laser pump power control to produce pulses according to processes described above, e.g., 300, 400, and/or 500, with the pulses having a substructure frequency of for example 1 kHz to 100 kHz. Such waveforms may be as so-called "spin-scan" and "con-scan" systems, and thus could be designed or chosen for such dual capability.

The above-described processes for disabling one or more scanning imaging systems, represent specific examples of a generalized process, which optimizes the ability of a pulsed laser to disable line-scanning imaging systems. The processes described may disable any such scanning imaging system whether it focuses light at any wavelength or has any number of lines-per-frame, or for any frame rate. The pulsed laser, whose modulation waveform is being determined by the process, may have any other specifications as long as the laser pulses are such that one of them will disable the functionality of the scanning imaging system. A more general embodiment of the present invention will be described below.

Figure 6:
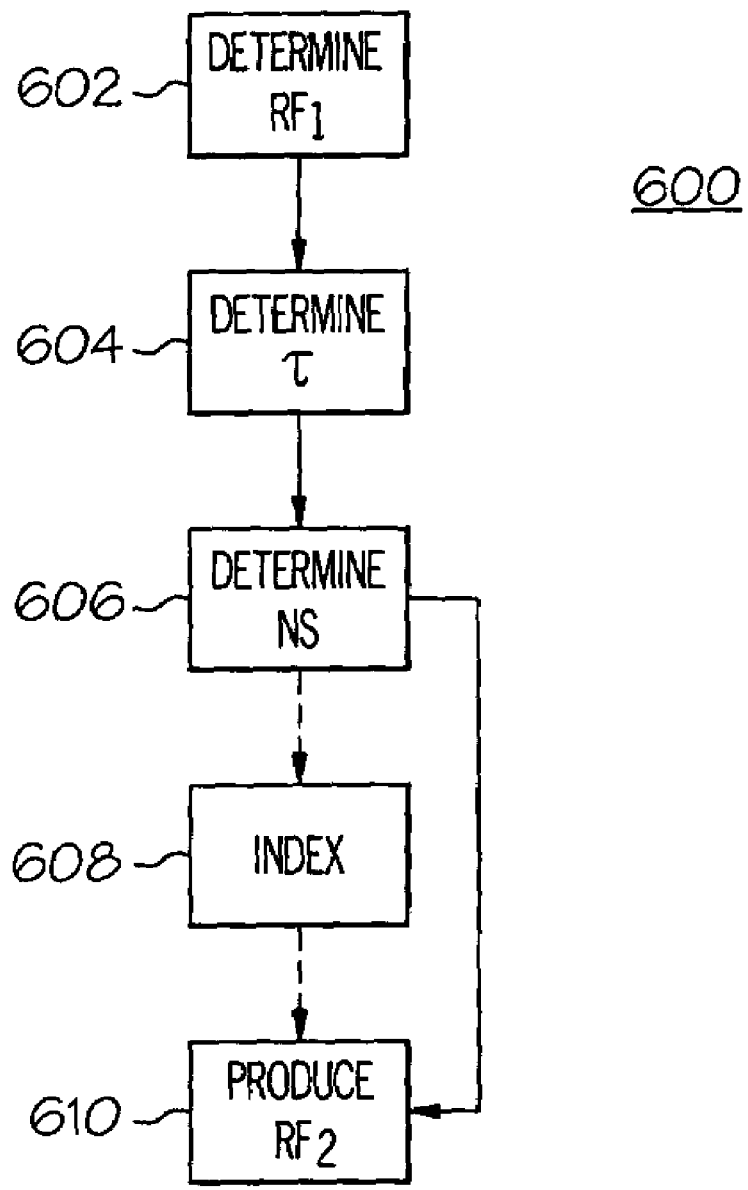
FIG. 6 shows a process for causing the simultaneity of events from one or more first families of events and events from a second family of events according to the present.

Referring to FIG. 6, another embodiment of the present invention will now be described. A generalized process 600 is described, which is concerned with events of a first kind or family, occurring at a first repetition frequency $RF_1$, and events of a second kind or family occurring at a second repetition rate $RF_2$. The events of the first family have a predetermined substructure or subsequence in time or space. This substructure or subsequence is referred to as "modulus M" hereinafter, where the integer M is the number of regular steps, positions, or components in the substructure or subsequence. Process 600 may be followed to optimize the probability that M different number of events of the first family each coincide in time with at least one event of the second family within an arbitrary, selected time T with precision to within a certain time increment. In preferred embodiments, this time increment is plus-or-minus $1/(2*RF_1)$, so as to ensure coverage of the given number of first family events in time or space.

This embodiment includes a generalized process 600 for producing the simultaneity of events from different families of events by calculating and producing a repetition rate for one of the families based on one or more repetition rates of the other families. A first family of events has a repetition frequency $RF_1$ that is determined, step 602. The first family of events has an inherent substructure or subsequence, i.e., modulus M (a positive integer,) which may be temporal or geometric or both. A time period $\tau$ is selected within which a simultaneity of events is desired, step 604. Also, a value of a number of steps NS, which corresponds to the time between successive events of a second controlled family of events, is determined, step 606, according to the following equation:

$$NS=Int[\tau*(RF_1/M)] \qquad (8),$$

where Int(a) means the largest integer $\leq a$. NS may advantageously be changed to an odd number when M is even, and may in all cases be advantageously changed to be a prime number. The value of NS is then used to calculate a repetition frequency of the second family of events according the following equation:

$$RF_2=RF_1/NS \qquad (9)$$

This repetition frequency derived from NS is then supplied to the events of the second family of events, step 610, i.e., the events from the second family are controlled to occur at the repetition frequency $RF_2$. An index time period may be supplied between two or more events of the events from the second family of events, step 608, and will be described relative to process 700 in greater detail below.

Figure 7:
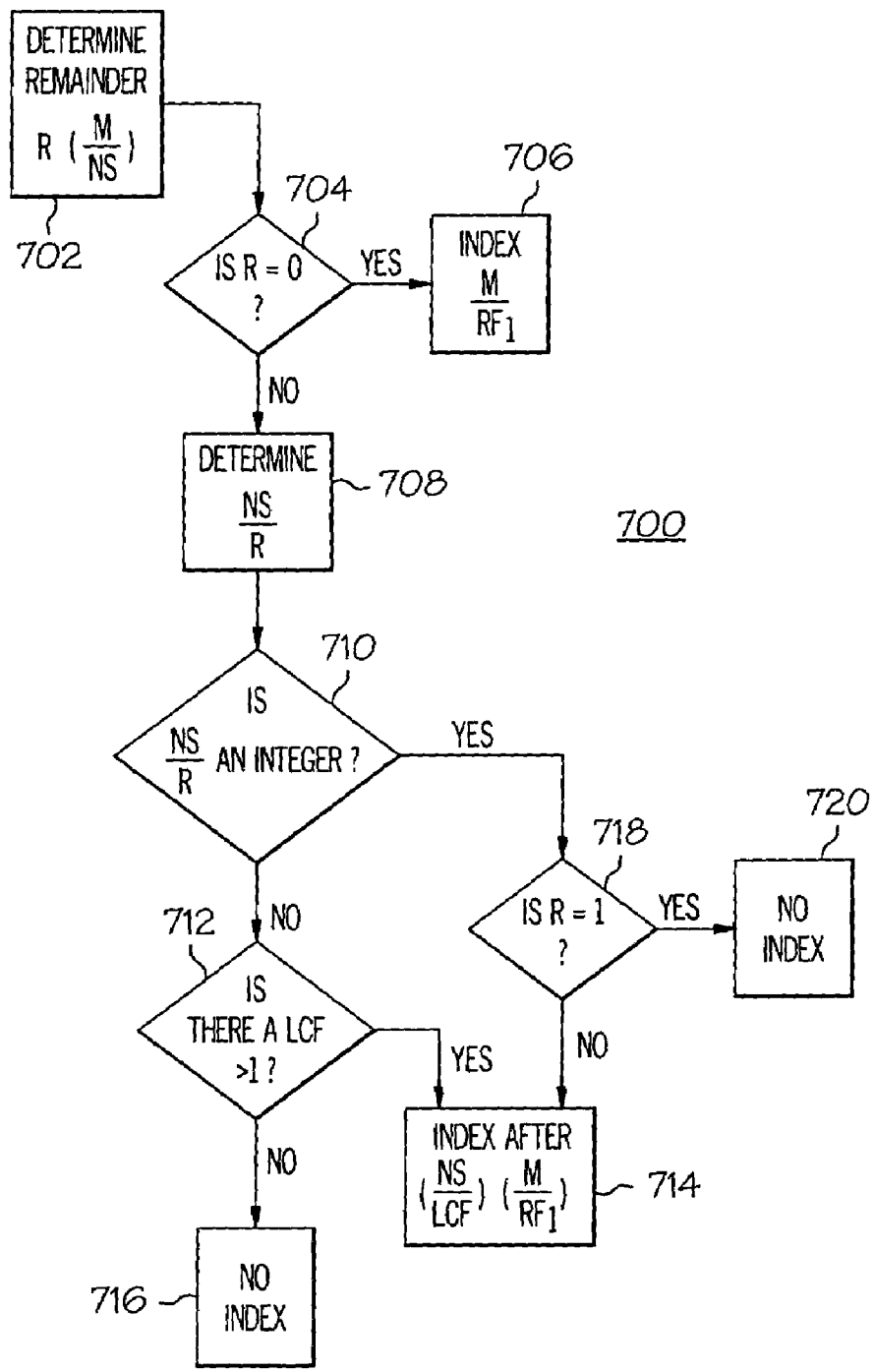
FIG. 7 shows a process for supplying an index time period between events of the second family of events shown in FIG. 6.

Referring now to FIG. 7, a process 700 for determining if and when an index time period should be supplied to the number of steps between events of the second family of events is described. An index or index time period may be supplied between two or more events of the second family to obtain an Efficient Solution. Such indexing has the effect of altering the time between two events from the second family of events, and such indexing may be performed more than once during the selected time $\tau$.

To determine if and when an index time period should be provided between two or more of the events of the second family, a remainder R is calculated, step 702, from a quotient of the modulus M divided by the number of steps NS, both of which have a positive integer value, according to the following equation:

$$R=R[M/NS] \qquad (10)$$

where R[a/b] indicates the remainder function that returns an integer remainder of the quotient of a and b. The remainder R represents the offset distance or time in relation to the first family of events that subsequent events of the second family will be positioned. The remainder R is compared to zero, at step 704. If the remainder R is equal to zero, then an index having a corresponding index time period is applied to the number of steps after every M number of events of the first family, step 706. This index having a corresponding index time period is provided when R=0 because without doing so, subsequent events of the second family could occur simultaneously with the same events of the first family, in modulo M, after a period of time, $M/RF_1$, which could preclude an Efficient Solution.

Returning to step 704, when the remainder R is not equal to zero, a value of the quotient of the number of steps NS divided by the remainder R is calculated, step 708. Next, this quotient is examined to see if it is an integer, step 710. If the quotient is not an integer, a largest common factor, not including one, of the number of steps and the remainder is sought, step 712. If a largest common factor LCF does exist, then indexing is provided to the number of steps NS for every time period corresponding to the number of steps divided by the largest common factor, i.e., after a time corresponding to $[(NS/LCF)*(M/RF_1)]$, step 714. If there is no largest common factor, then no index is provided to the number of steps, as shown at 716, since this indicates that the repetition frequency $RF_2$ corresponding to the particular number of steps NS represents an Efficient Solution.

Returning to step 710, when the quotient of the number of steps divided by the remainder R is an integer, the remainder R is compared to one, step 718. If the remainder R is equal to one, then no index time period is supplied, shown as 720, because the number of steps provides an Efficient Solution. If the remainder is not equal to one, then an index having a corresponding index time period is supplied to the number of steps for every time period corresponding to the number of steps divided by the largest common factor, i.e., after a time corresponding to $[(NS/LCF)*(M/RF_1)]$, step 714. In preferred embodiments, the value of the time index may be the inverse of the $RF_1$.

Processes 600 and 700 may optimize the probability that M events of a first frequency having a modulus M will occur with a desired number of events of a second frequency within a given period of time. In preferred embodiments, the second repetition frequency is controlled to be less than the first repetition frequency. The following example is given to further explain the invention.

EXAMPLE 1

Controlling a pulsed laser to disable a scanning optical imaging system that has eight lines per frame and a scanning rate of 30 Hz. A scanning optical imaging system can have an internal field of view or image frame that is scanned when a rotating mirror is placed on the optical path within the scanning optical imaging system. The frame can be larger than a detector array placed at the foal plane. For such a system having a frame that is eight times as wide as the detector array, the system has eight lines per frame (LPF) or LPF of eight. As a result, the frame for this system traverses eight detector or line widths as the frame scans past the detector array in the focal plane. Because the rotating mirror has a frequency of repetition, it consequently scans the frame across the detector array at a certain frame rate, e.g., 30 Hz. The frame rate FR when multiplied by the lines per frame determines how many lines in the systems are scanned per second, which is the line rate. For a scanning optical imaging system with a LPF of 8 and FR of 30 Hz, the line rate is 240 Hz.

To disable this scanning optical imaging system, a laser producing pulses at a pulse repetition frequency of 240 Hz would efficiently cover all of the possible line positions. Provided that the fluence of the pulses are sufficient, disabling damage will quickly occur on the line matching the location of the laser in the image when the line also includes the detector array. When such a scanning system focuses pulses from a laser producing pulses at 240 Hz, disablement will occur in one frame, or 1/30 of a second because at this pulse repetition frequency, the first eight pulses cover all eight possible line positions within the image field. For typical detector materials used for infrared detection, fluences of between 0.1 Joule/cm$^2$ to 10.0 Joules/cm$^2$ may be sufficient to produce disablement. For this scanning system, a pulsed laser with lower pulse repetition frequencies may be used to accomplish disablement in a longer time than one frame, for example one second, not 1/30 of a second. In this case eight pulses, one for each line position, would produce disablement in one second, and a laser with a pulse repetition frequency of only 8 Hz might be used. Such a slower pulse repetition frequency leads to lower average power requirements and reduces the size needed for the laser and power source, which is desirable on many platforms, including for example, airborne platforms.

The timing of the first eight pulses will be determined by following processes 300 and 400 already described above. As stated above, the line rate of the scanning imaging system is known to be 240 Hz. The inverse of the line rate is consequently 1/240 of a second and is a fundamental time period for this scanning system. For this embodiment, all index time periods, corresponding to a number of steps derived through equation (5), will be integer multiples of this time period. A desired disablement time $\tau_D$ of one second is selected, as previously described. Next, a number of steps value NS is calculated taking into consideration the desired disablement time and the frame rate FR of the scanning system, according to equation (5):

$$NS = Int(\tau_D * FR) \quad (5)$$

The number of steps is thus 30, which corresponds to a time interval of 30 in units of the inverse of the line rate or 30/240 s, which time interval here is 1/8 s. Equation (5) may be used for all situations of interest and is valid for instances where the frame rate of the particular scanning is not an integer number of cycles per second. The pulse repetition frequency PRF that the disabling laser is controlled to have is determined from equation (6):

$$PRF = LR/NS \quad (6)$$

For this example, equation (6) results in a pulse repetition frequency of 8 Hz.

With this pulse repetition frequency known, process 400 can be followed to determine if pairs of subsequent pulses from the laser should be delayed or advanced by index time periods to optimize the disablement of the scanning imaging system. A remainder R is calculated according to equation (7) and step 402:

$$R = R[LPF/NS] \quad (7)$$

The integer remainder R for Example 1 is R[8/30], which is equal to eight.

Process 400 is then followed to see if an index time period should be supplied to some subsequent pulse interval, and if so, when such an index time period should be applied. R is examined at step 404. Since R is not equal to zero, the quotient of the number of steps NS divided by the remainder R is calculated, 30/8, according to step 408. This quotient is examined to see if it is an integer, which is the inquiry at step 410. Since this quotient is not an integer, a largest common factor of the number of steps 30 and the reminder 8 is sought, as per step 412. The largest common factor LCF of these two numbers is two. According to step 414, an index time period of plus or minus 1/240 s is supplied between subsequent pulses after every time period equal to NS/LCF frames or 30/2 (1/30 s) or 0.5 seconds. For a desired disablement time of 1 second, a laser should be controlled to fire four pulses with a pulse repetition frequency of 8 Hz, then the fifth pulse is delayed by an index time period of 1/240 s and then the subsequent pulses six through eight are fired again at 8 Hz. This index time period is supplied as specified because without doing so, each series of four subsequent pulses entering the scanning imaging system would hit the same positions on the focal plane as the first four. Since there are eight lines in this system, the probability of disabling the system without implementing an index time period is 50% in the absence of image location variations due to the relative motion between the scanning system and the disabling laser. It is noted here that tracking or seeker systems commonly employ techniques and devices that minimize such image location variations of targets.

Alternatively for the above example, because the lines per frame is an even number, the number of steps value NS can be chosen to be a nearest odd number to the number of steps NS as described above for process 300, i.e., 30 plus or minus one or 31 or 29. By choosing the number of steps value to be odd, process 300 shows that in this case an Efficient Solution may be arrived at directly and the need for providing an index time period can be avoided.

It should be understood that the invention may have other embodiments than those described above. For example, process 600 and 700 may be used for those applications in which it is critical that one or more of a first kind of event occurs simultaneously with one or more of another repetitive kind of event, e.g., the arrival of a light pulse, the occurrence of any type of signal or signal parameter or characteristic, etc. Other modifications may be made to the above-described preferred embodiment of the invention without departing from the spirit and scope of the invention as described in the following claims. It should also be understood that while steps have been given in a particular order in the description of the processes of the present invention, the order of the steps may vary within the scope of the present invention, as will be apparent to those skilled in the art.

What is claimed is:

1. A process for disabling a scanning optical system comprising the steps of:
   identifying a first line rate of said scanning optical system, said scanning optical system having a detector array and a modulus;
   selecting a disablement time;
   calculating a number of steps equal to an integer less than or equal to a product of said disablement time and said first line rate divided by said modulus; and
   controlling a laser output of two or more pulses, wherein said two or more laser pulses have a pulse repetition frequency equal to said line rate divided by said number of steps.

2. The process of claim 1, wherein said number of steps comprises an odd number.

3. The process of claim 1, wherein said number of steps comprises a prime number.

4. The process of claim 1, wherein said modulus comprises said lines per frame of said scanning optical system.

5. The process of claim 4, wherein said step of identifying said first line rate further comprises multiplying said modulus and a frame rate of said scanning optical system, and wherein said first line rate is equal to the product of said step of multiplying.

6. The process of claim 5, wherein said frame rate comprises a scanning portion and a reset portion.

7. The process of claim 1, wherein said step of controlling a laser output of two or more pulses further comprises:
dividing said lines per frame by said number of steps;
calculating a remainder from said step of dividing;
comparing said remainder to zero; and
supplying an index time period between two or more of said output of laser output of two or more pulses, if said remainder is zero.

8. The process of claim 7 wherein said step of supplying an index time period further comprises the steps of:
calculating a quotient of the number of steps divided by the remainder, if said remainder is not equal to zero;
determining if said quotient is an integer;
if said quotient is not an integer, determining if there is a largest common factor LCF;
if there is an LCF, supplying an index time period every (NS/LCF)* modulus/$RF_1$; and
supplying an index time period every (NS/LCF)*modulus/$RF_1$, if said quotient is an integer and R does not equal one.

9. The process of claim 1, further comprising the step of identifying two or more line rates of two or more scanning optical systems, wherein said first line rate is the largest line rate of said two or more line rates.

10. A system for disabling a scanning optical system having a detector array, a frame rate, a number of lines per frame, and a line rate or first repetition frequency, comprising:
a laser
a controller coupled to said laser and operable select a disablement time and further operable to produce two or more laser control pulses having a pulse repetition frequency substantially equal to equal to said line rate divided by a number of steps, wherein said number of steps are substantially equal to an integer less than or equal to a product of said disablement time and said line rate divided by said lines per frame, wherein said laser is responsive to said two or more laser control pulses by generating corresponding laser pulses and wherein each of said two or more laser pulses having a fluence sufficient to disable a detector in said detector array, wherein said two or more pulses are received by said scanning optical system.

11. The system of claim 10 wherein said number of steps is an odd number.

12. The system of claim 10, wherein said number of steps is a prime number.

13. The system of claim 12, wherein said controller includes a computer connected to an active pulse control system of said laser.

14. The system of claim 13, wherein said computer includes a computer-readable medium having computer-executable instructions stored thereon to produce said second repetition frequency.

15. The system of claim 10, wherein said two or more pulses further comprise a substructure.

16. The system of claim 15, wherein said substructure is modulated between about 1 kHz and about 100 kHz.

17. The system of claim 10, said laser further comprising a Q-switched or cavity-dumped laser.

18. The system of claim 10, wherein said pulses have a substructure modulated at about 1 kHz to about 100 kHz.

* * * * *